J. R. CASPER.
SIGNALING DEVICE.
APPLICATION FILED MAY 6, 1914.

1,133,361.

Patented Mar. 30, 1915.
2 SHEETS—SHEET 1.

Witnesses
Philip E. Barnes
Henry P. Alden

Inventor
John R. Casper
By Percy H. Moore
Attorney

J. R. CASPER.
SIGNALING DEVICE.
APPLICATION FILED MAY 6, 1914.
1,133,361.
Patented Mar. 30, 1915.
2 SHEETS—SHEET 2.
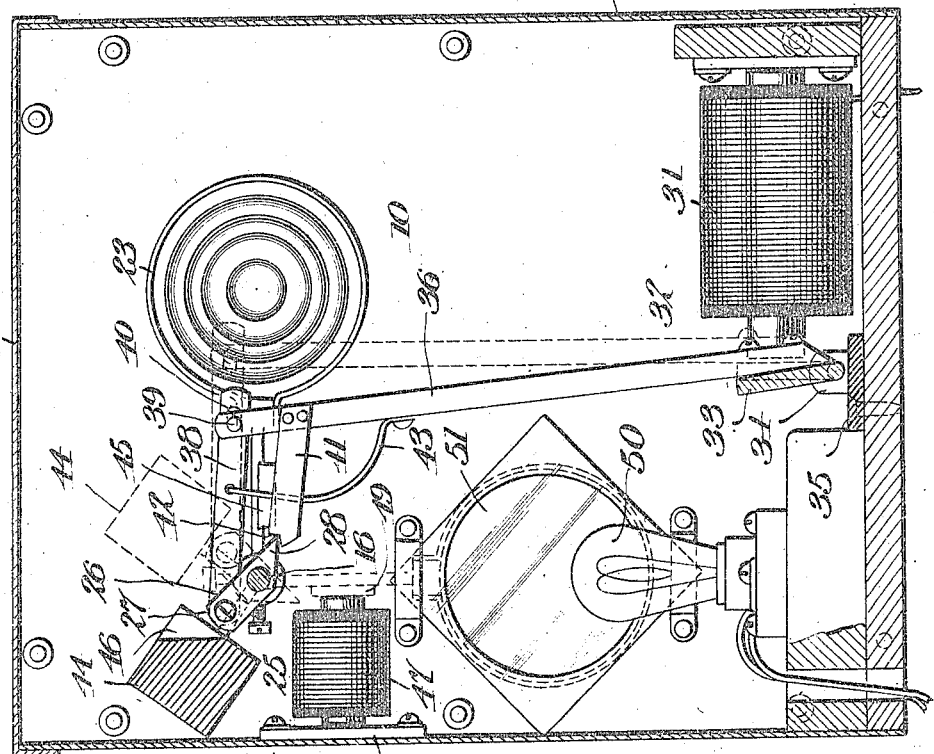
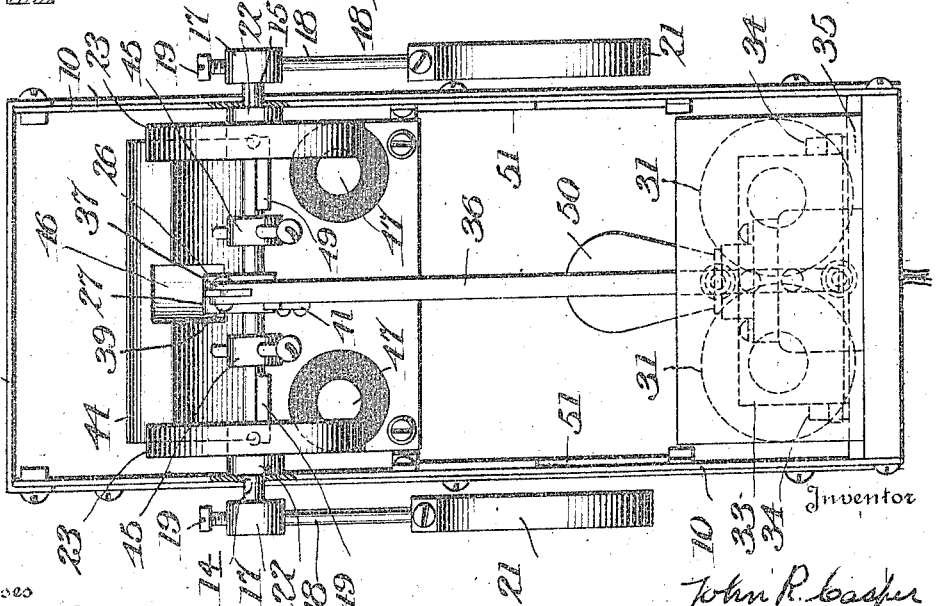

UNITED STATES PATENT OFFICE.

JOHN R. CASPER, OF WASHINGTON, DISTRICT OF COLUMBIA.

SIGNALING DEVICE.

1,133,361.  Specification of Letters Patent.  Patented Mar. 30, 1915.

Application filed May 6, 1914. Serial No. 836,709.

*To all whom it may concern:*

Be it known that I, JOHN R. CASPER, a citizen of the United States of America, residing at Washington, District of Columbia, have invented certain new and useful Improvements in Signaling Devices, of which the following is a specification.

This invention relates to certain new and useful improvements in signaling devices for road vehicles and is more particularly adapted for use upon automobiles to indicate the direction of travel thereof as when the operator proposes to deviate from his straight-away course or to stop.

The invention has for an object to provide a simple, efficient and economically constructed device of this character adapted to be carried by the automobile, preferably upon the left side thereof, and which is easily discernible by pedestrians or the occupants of other vehicles from either the front or to the rear of the automobile, any suitable means for operating the signal from a distance being utilized.

Other and further objects and advantages of the invention will be hereinafter set forth and the novel features thereof defined by the appended claims.

Figure 1:
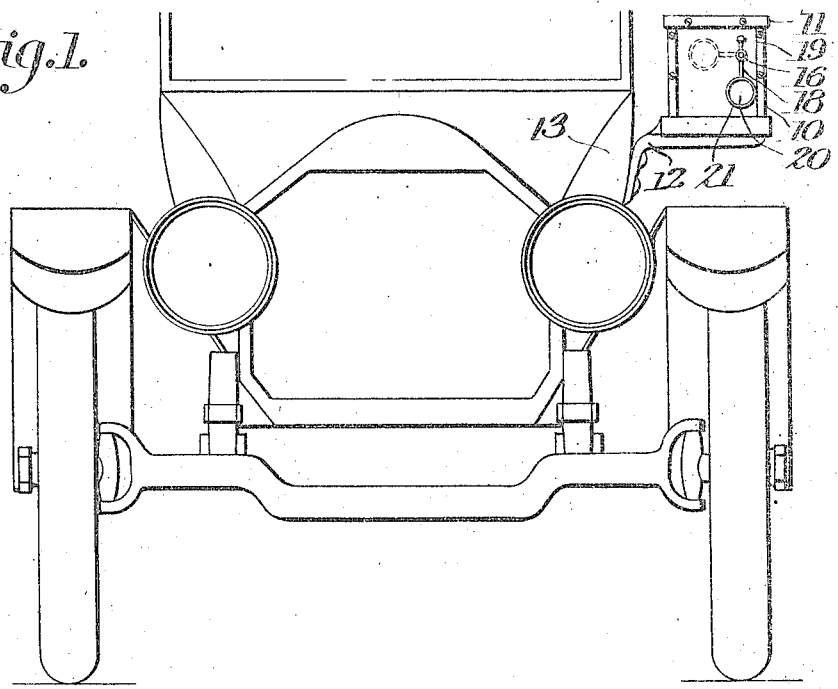
Figure 2:
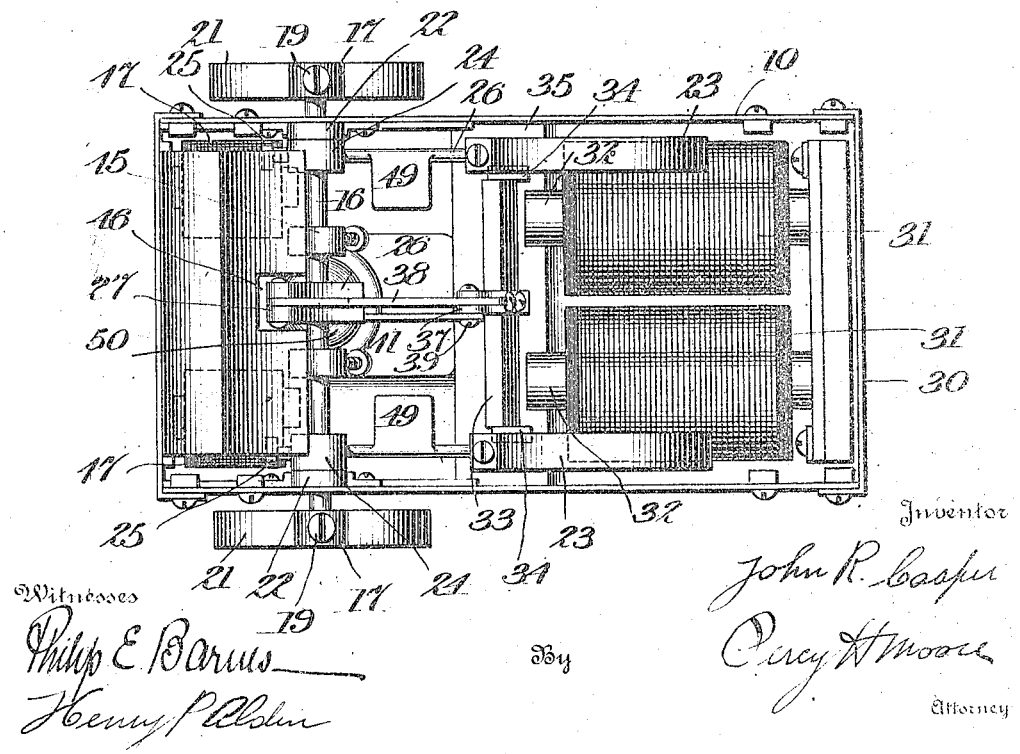

In the drawings: Figure 1 is a view showing the application of the device to an automobile; Fig. 2 is a plan view with the cover removed; Fig. 3 is a sectional elevation of the device with the front of the casing removed; and Fig. 4 is an end elevation, one end of the casing being removed.

Like numerals of reference refer to like parts in the several figures of the drawings.

In the drawings, the numeral 10 designates a casing of suitable shape and material provided with a closure member 11 and any desired means as shown at 12 for detachably fastening the casing to a vehicle 13.

The casing is provided in both its front and rear walls with apertures 14 and 15 forming bearings for a transverse shaft 16, said shaft being disposed above the horizontal center of the casing and toward the free end thereof. Each end of the shaft protrudes beyond the outer wall of the casing and receives a sleeve 17 which is secured to one end of an arm 18, a set screw 19, or other fastening means, extending through the sleeve for rigidly attaching the arm to the shaft. At its other end, the arm 18 carries a circular opaque glass 20 of greenish tinge forming a semaphore 21 such arm normally lying in a vertical position with respect to the casing, the circular glass 20 thereof alining with a glazed opening 51 formed in the adjacent wall of the casing.

Within the casing and in proximity to the face of both the front and rear walls thereof respectively, is a semaphore 23 comprising a sleeve 24 adjustably carried by the shaft, a set screw 25 being utilized for the purpose, and an arm 26 rigidly attached at one end to the sleeve 24 and at the other end to a circular opaque glass of reddish color. With the exception of the difference in color of the glass, the semaphore 23 is identical in construction with semaphore 21. A collar 22, surrounding the shaft and affixed to the wall of the casing is used for the purpose of reinforcing the bearings for the shaft and also to space the inner semaphores from the casing walls. Centrally disposed about the shaft is a crank arm 26 having a bifurcated upper end 27 and a slightly beveled lower end 28, the crank being secured in place upon the shaft by means of a set-screw or other suitable fastening means.

Suitably mounted upon the base of the casing adjacent the inner end 30 thereof are a plurality of electro-magnets 31, the cores 32 of which extend beyond the coils of the magnets and are adapted to influence a soft metal plate 33 which is pivoted between the upstanding ears 34 of a transversely disposed member 35 of non-conducting material secured to the base of the casing and in proximity to the projecting cores of the magnets. Intermediate the ends of the metal plate 33, an upwardly extending bar 36 is secured at one end, the free end of the bar being slit as at 37 to receive and loosely hold one end of a connecting rod 38, a suitable pin 39 extending through apertures formed in the free end of the bar 36 and an elongated slot 40 in the rod 38 for this purpose. At its opposite end, the rod 38 is pivotally secured between the bifurcated upper end 27 of the crank arm 26 as clearly shown in the drawings. Adjacent the free end of the bar 36 is a detent 41 having a cut out portion as at 42 adapted to co-act with the lower beveled end 28 of the crank arm 26; while properly secured at one end to the bar 36 is a suitable spring 43, the other end thereof being secured to the connecting rod;—the purpose of these parts being later set forth. As aforesaid, when normal, the green semaphores assume a vertical position, the colored glass thereof alining with the glazed openings in the walls of the casing. At such time, the red semaphores are adjusted to extend toward the inner end of the casing in a horizontal or substantially horizontal position and are thus held by means of the detent 41 engaging with the beveled end or shoulder 28 of the crank arm, the spring 43 tending to withdraw the bar 36 and plate 33 from contact with the base magnet as will be readily understood, the elongated slot 40 permitting the pin 39 to ride forwardly therein.

In order to further insure the normal position of the parts, a counterweight 44 of suitable dimensions is supported from the shaft by means of the members 45, set screws being utilized whereby the inclination of the counterweight may be properly adjusted about the shaft to facilitate the working of the parts. As will be seen from Figs. 3 and 4 the counterweight is notched at 46 so that when the red semaphores are in their lowermost position and the glass thereof alines with the glazed openings of the casing, free play is permitted the connecting rod 38.

The electro-magnets 31 are connected by suitable wiring of any well known type, not shown, to a point convenient to the operator so that he may, at pleasure, energize the base magnets and thereby attract the metal plate 33 and bar 36 so as to draw the same rearwardly, thus releasing the detent and causing the shaft to revolve until the danger or red semaphores aline with the glazed openings in the casing. When in this position, as will be understood, the green semaphores will be sw ng outwardly beyond the end of the casing into approximately horizontal position and represent to third parties both in front and to the rear of the vehicle, a desire on the part of the operator to alter his course. To further insure the retention of the parts in their danger position, electro-magnets 47 are secured upon the inner face of the outer end wall 48 of the casing, as shown, soft metal plates 49 being attached to one or both of the arms 50 of the red semaphore so as to contact with the magnet and be retained thereby, these plates also serving to limit the movement of the parts in one direction. The end electromagnet 47 is placed in series with the base electro-magnets 31. An electric-bulb 50, in circuit with the electro-magnets or otherwise, is conveniently arranged within the casing so that the reflection thereof may be clearly seen through the glazed openings 51 and alining semaphores at night. By properly adjusting the counterweight upon the shaft, it will of course be understood that upon the breaking of circuit through the magnets, the parts are returned to normal position due to the laws of gravity and are held in such position by the engagement of the detent with the crank arm as above pointed out.

What is claimed is:

1. A signaling device for automobiles comprising a casing having glazed openings, a rotatable shaft extending through said casing, the ends of the shaft protruding beyond the walls of said casing, a green semaphore attached to each of the protruding ends of said shaft and normally lying in a vertical position with respect to the casing, the glass of the semaphore alining with said glazed openings, a red semaphore attached to said shaft and lying at approximately right angles to said green semaphore, and means for rotating said shaft to throw said green semaphores beyond the outer wall of said casing and to bring said red semaphores into register with said glazed openings.

2. A signaling device for automobiles comprising a casing having glazed openings, a rotatable shaft extending through said casing, the ends of the shaft protruding beyond the walls of said casing, a green semaphore attached to each of the protruding ends of said shaft and normally lying in a vertical position with respect to the casing, the glass of the semaphore alining with said glazed openings, a red semaphore attached to said shaft and lying at approximately right angles to said green semaphore, and electric means for rotating said shaft to throw said green semaphores beyond the outer wall of said casing and to bring said red semaphores into register with said glazed openings.

3. In a device of the type described, the combination with a casing having glazed openings and bearings formed therein, of a rotatable shaft working in said bearings, the ends of said shaft protruding beyond the walls of the casing, a pair of semaphores secured to the protruding ends of said shaft and normally alining with said glazed openings, a second pair of spaced semaphores secured to said shaft within the casing and lying approximately at right angles to the outer semaphores, a crank arm having a bifurcated upper end secured to said shaft, electro-magnets disposed within said casing, a connecting rod pivotally attached at one end between the bifurcations of said crank arm, and means attached to the other end of said rod influences by said electromagnets to rotate said shaft for throwing said outer semaphores out of register and said inner semaphores into register with said glazed openings.

4. In a device of the type described, the combination with a casing having glazed openings, of a shaft extending through said casing, semaphores attached to said shaft at an angle to each other, a crank arm having a bifurcated upper end secured to said shaft, a connecting rod pivotally attached at one end between the bifurcations of said crank arm, said rod having an elongated slot in its free end, a metal plate pivoted within said casing, a bar secured at one end to said plate and at its other end having a pin connection within the elongated slot of said rod, a detent secured to said bar and contacting with said crank arm, and electro-magnets disposed within said casing and adapted when energized to attract said metal plate to withdraw said detent from said crank and rotate said shaft to alternately aline said semaphores with the glazed openings in said casing.

5. In a device of the type described, the combination with a casing having glazed openings, of a shaft extending through said casing, semaphores attached to said shaft at an angle to each other, a crank arm having a bifurcated upper end secured to said shaft, a connecting rod pivotally attached at one end between the bifurcations of said crank arm, said rod having an elongated slot in its free end, a metal plate pivoted within said casing, a bar secured at one end to said plate and at its other end having a pin connection within the elongated slot of said rod, a detent secured to said bar and contacting with said crank arm, a spring for normally retaining said detent in engagement with said crank arm, and electro-magnets disposed within said casing, and adapted when energized to attract said metal plate to withdraw said detent from said crank and rotate said shaft to alternately aline said semaphores with the glazed openings in said casing.

6. A signaling device comprising a casing having glazed openings, a shaft extending through said casing, the ends of said shaft protruding beyond the walls of the casing, a green semaphore attached to each of the protruding ends of said shaft and normally alined with said glazed openings, a pair of red semaphores attached at intervals to said shaft within said casing and lying at approximately right angles to said green semaphores, means for rotating said shaft to throw said green semaphores beyond the outer end of said casing and to aline said red semaphores with said glazed openings, and an electro-magnet disposed within said casing adapted to attract said red semaphores and to limit the movement of the semaphores in one direction.

7. A signaling device for automobiles comprising a casing having glazed openings, a shaft extending through said casing, two pairs of semaphores attached to said shaft at an angle to each other, means for rotating said shaft to alternately aline said pairs of semaphores with said glazed openings, means released by said rotating means for locking one of said pairs of semaphores in alinement with said glazed openings and electromagnetic means actuated simultaneously with said shaft rotating means for attracting the other pair of semaphores and holding them in alinement with said glazed openings.

In testimony whereof I affix my signature in presence of two witnesses.

JOHN R. CASPER.

Witnesses:
U. S. J. Dunbar, Jr.,
H. E. Bready.